(12) United States Patent
Roh

(10) Patent No.: US 9,411,411 B2
(45) Date of Patent: Aug. 9, 2016

(54) WEARABLE ELECTRONIC DEVICE HAVING TOUCH RECOGNITION UNIT AND DETACHABLE DISPLAY, AND METHOD FOR CONTROLLING THE ELECTRONIC DEVICE

(71) Applicant: LG ELECTRONICS INC., Seoul (KR)

(72) Inventor: Taewoo Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/249,230

(22) Filed: Apr. 9, 2014

(65) Prior Publication Data

US 2015/0077353 A1    Mar. 19, 2015

(30) Foreign Application Priority Data

Sep. 17, 2013 (KR) .......................... 10-2013-0111974

(51) Int. Cl.
| | |
|---|---|
| *G06F 3/041* | (2006.01) |
| *G06F 3/01* | (2006.01) |
| *G06F 3/0488* | (2013.01) |
| *H04M 1/05* | (2006.01) |
| *H04M 1/60* | (2006.01) |
| *H04M 1/725* | (2006.01) |

(52) U.S. Cl.
CPC .............. *G06F 3/011* (2013.01); *G06F 3/0488* (2013.01); *H04M 1/05* (2013.01); *H04M 1/605* (2013.01); *H04M 1/72519* (2013.01); *H04M 1/72558* (2013.01); *H04M 2250/12* (2013.01); *H04M 2250/22* (2013.01)

(58) Field of Classification Search
CPC .............. H04R 2420/07; H04R 5/033; H04R 2201/107; G06F 1/163; G06F 3/011; G06F 1/1626; G06F 1/1654; G06F 3/0346; G06F 3/0362; G06F 3/044; G06F 3/0488; H04M 1/05; H04M 1/6058; H04M 1/605; H04M 1/72519; H04M 1/72558; H04M 2250/12; H04M 2250/22

See application file for complete search history.

(56) References Cited

U.S. PATENT DOCUMENTS

| 7,542,012 B2 * | 6/2009 | Kato ................... G02B 27/0176 345/1.1 |
| 2004/0121796 A1 * | 6/2004 | Peng .............................. 455/522 |

(Continued)

OTHER PUBLICATIONS

David Pogue, iPhone: The Missing Manual, 2007, pp. 6, 9-10, 65-66, 72, 78-80, 82 ISBN: 9780596513740.*

(Continued)

*Primary Examiner* — Lun-Yi Lao
*Assistant Examiner* — Elliott Deaderick
(74) *Attorney, Agent, or Firm* — Lee, Hong, Degerman, Kang & Waimey; Jonathan Kang; Harry Lee

(57) ABSTRACT

An electronic device includes: a touch recognition unit provided on at least one side of the frame; a sensing unit that detects where the frame is worn; and a controller that detects, through the sensing unit, at least one of a first position where the frame is worn on the user's head, a second position where the frame is worn around the user's neck, and a third position where the frame is separate from the user, detects a touch input on the touch recognition unit, and controls call-related operations based on at least either the detected position where the frame is worn or the detected touch input. Accordingly, a variety of call-related or multimedia data-related functions can be used efficiently by changing the position where a frame wearable around the neck or on the head is worn.

14 Claims, 22 Drawing Sheets

(a)          (b)

(56) References Cited

U.S. PATENT DOCUMENTS

| | | | | |
|---|---|---|---|---|
| 2006/0045304 A1* | 3/2006 | Lee | ............... | H04R 1/1041 381/384 |
| 2009/0003641 A1* | 1/2009 | Van Der Bilt | ........ | H04R 1/1041 381/374 |
| 2009/0262078 A1* | 10/2009 | Pizzi | ............... | G06F 1/1626 345/169 |
| 2010/0007581 A1* | 1/2010 | Kato | ............... | G02B 27/0176 345/8 |
| 2010/0020252 A1* | 1/2010 | Otsuki | ............... | H01M 10/44 348/838 |
| 2011/0249079 A1* | 10/2011 | Santamaria et al. | ........ | 348/14.02 |
| 2013/0076709 A1* | 3/2013 | Cha et al. | ............... | 345/204 |
| 2013/0114823 A1* | 5/2013 | Kari et al. | ............... | 381/74 |
| 2013/0259221 A1* | 10/2013 | Shusaku et al. | ........ | 379/390.01 |

OTHER PUBLICATIONS

David Pogue, iPhone: The Missing Manual, 2007, pp. 32, 70 ISBN: 9780596513740.*

* cited by examiner (a)                    (b)

FIG. 7
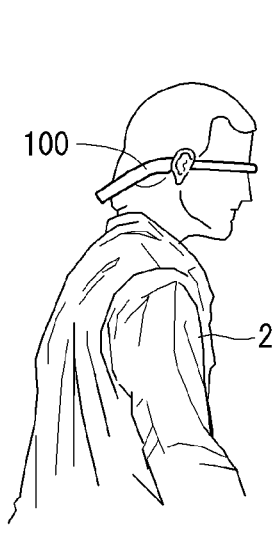
(a)
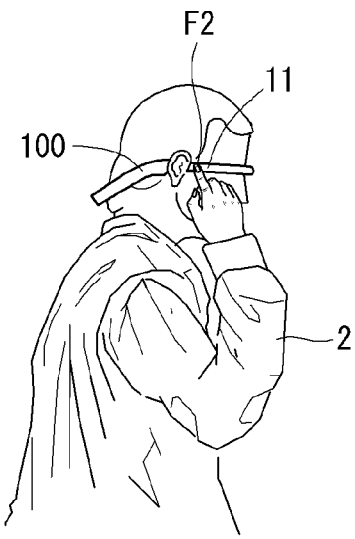
(b)

FIG. 9
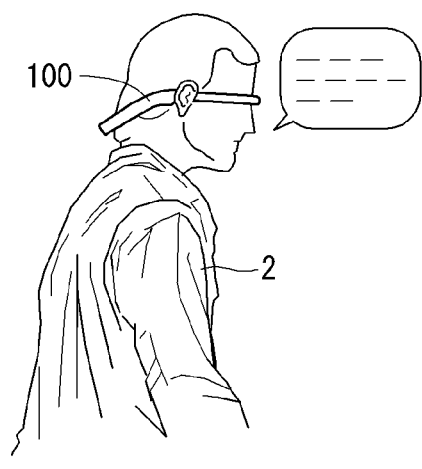
(a)
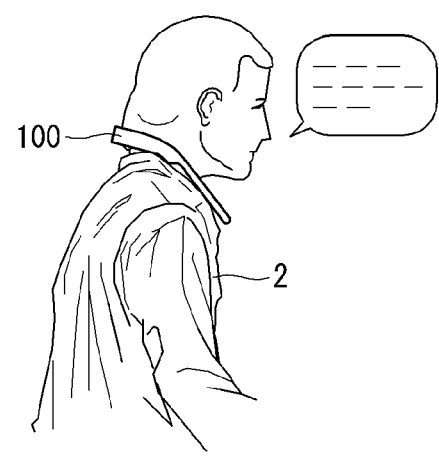
(b)

FIG. 10
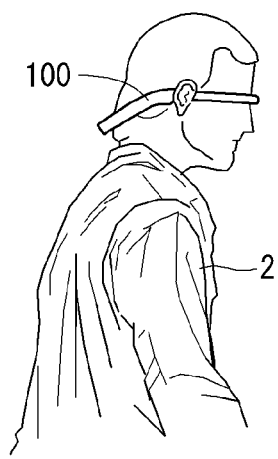
(a)
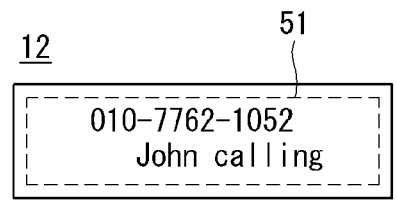
(b)

FIG. 11
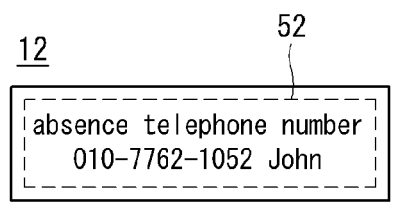
(a)
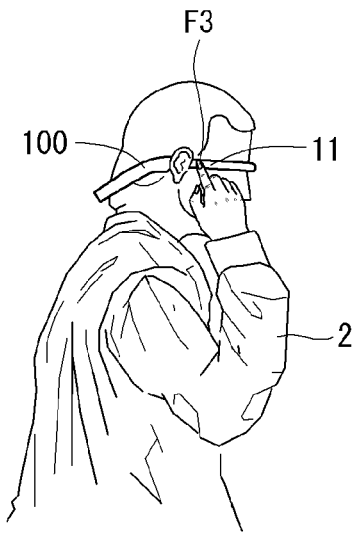
(b)

FIG. 15
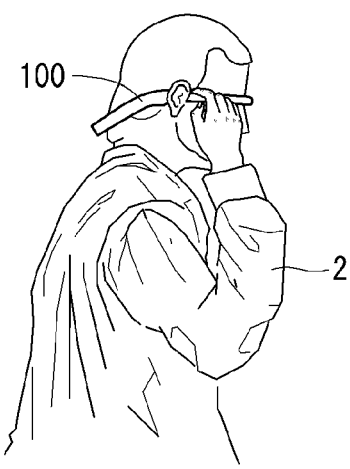
(a)
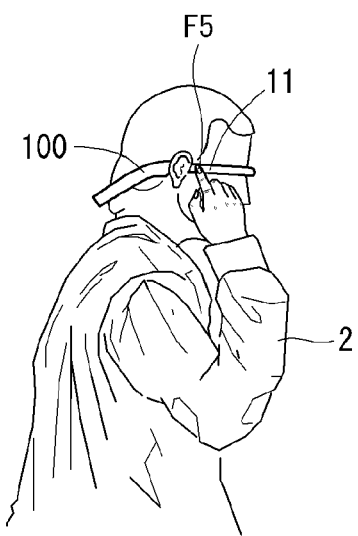
(b)
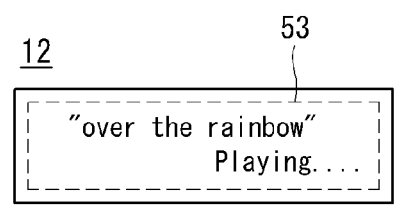
(c)

FIG. 16
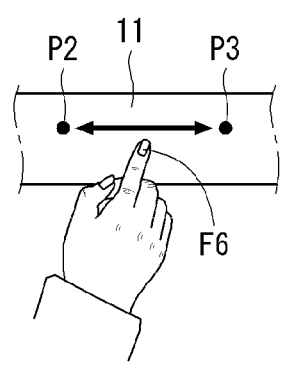 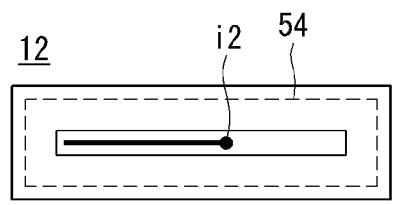
(a)                                 (b)

FIG. 17
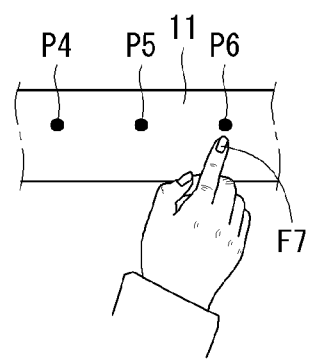
(a)
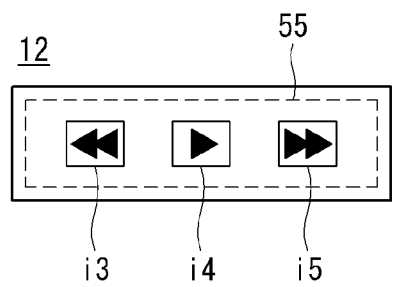
(b)

FIG. 18
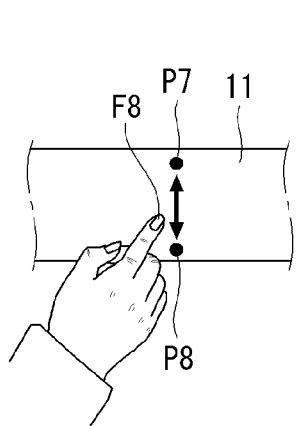
(a)
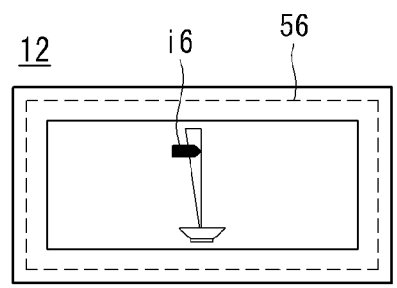
(b)

FIG. 19
(a) 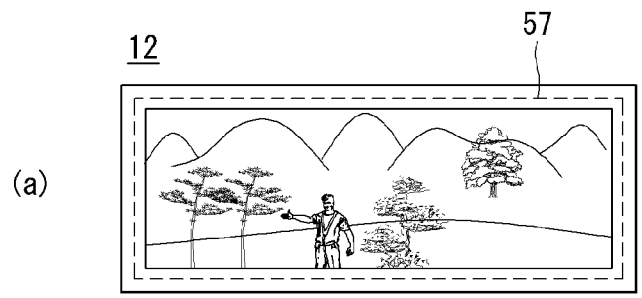
(b) 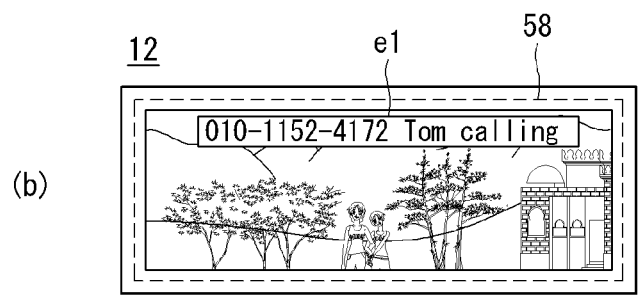

WEARABLE ELECTRONIC DEVICE HAVING TOUCH RECOGNITION UNIT AND DETACHABLE DISPLAY, AND METHOD FOR CONTROLLING THE ELECTRONIC DEVICE

CROSS-REFERENCE TO RELATED APPLICATIONS

Pursuant to 35 U.S.C. §119(a), this application claims the benefit of earlier filing date and right of priority to Korean Patent Application No. 10-2013-0111974, filed on Sep. 17, 2013, the contents of which are incorporated by reference herein in their entirety.

TECHNICAL FIELD

The present invention relates to an electronic device including a frame that a user can wear on the body, and more particularly, an electronic device whose operation is controlled according to which part of the body the user wears the frame on, and a control method thereof.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable. As various terminals including a mobile terminal provide a variety of complicated functions, menu structures also become complicated. Furthermore, a function of displaying digital documents including web pages through a terminal is added.

Recently, there is a demand for the development of wearable electronic devices.

SUMMARY

An object of the present invention is to provide an electronic device whose operation is controlled according to which part of the body the user wears the frame on, and a control method thereof. It is to be understood that technical objects to be achieved by the present invention are not limited to the aforementioned technical object and other technical objects which are not mentioned herein will be apparent from the following description to one of ordinary skill in the art to which the present invention pertains.

To accomplish the above object, an embodiment of the present invention provides an electronic device including a frame that a user can wear on the body, the electronic device including: a touch recognition unit provided on at least one side of the frame; a sensing unit that detects where the frame is worn; and a controller that detects, through the sensing unit, at least one of a first position where the frame is worn on the user's head, a second position where the frame is worn around the user's neck, and a third position where the frame is separate from the user, detects a touch input on the touch recognition unit, and controls call-related operations based on at least either the detected position where the frame is worn or the detected touch input.

If the detected position where the frame is worn changes from the second or third position to the first position while a call is coming in, the controller may connect to the call.

If the user is detected wearing the frame on the first position when there is an incoming call, the controller may connect to the call upon receiving a touch input on the touch recognition unit in a pattern preset for connecting to the call.

If the user is detected wearing the frame on the third position during the call, the controller may end the call.

If the user is detected wearing the frame on the second position during the call, the controller may set the call mode to speaker mode.

Upon receiving a touch input on the touch recognition unit in a pattern preset for ignoring the call while the call is coming in, the controller may ignore the call.

The electronic device may further include a display that is attachable and detachable to and from one end of the frame, and if the detected position where the frame is worn is the first position and the display is attached to the frame, the controller may display caller information of the incoming call on the display.

If the detected position where the frame is worn is the first position, the controller may transmit a call connection request to the number of the most recent incoming call upon receiving a touch input on the touch recognition unit in a pattern preset for a call connection request. The electronic device may further include a sound output unit including a bone conduction speaker, and the controller may adjust the volume of the sound output unit upon receiving a scroll input on the touch recognition unit.

To accomplish the above object, another embodiment of the present invention provides an electronic device including a frame that a user can wear on the body, the electronic device including: a touch recognition unit provided on at least one side of the frame; a memory that stores multimedia data; a sensing unit that detects where the frame is worn; and a controller that detects, through the sensing unit, at least one of a first position where the frame is worn on the user's head, a second position where the frame is worn around the user's neck, and a third position where the frame is separate from the user, detects a touch input on the touch recognition unit, and controls multimedia data-related operations based on at least either the detected position where the frame is worn or the detected touch input.

The electronic device may further include a sound output unit including a bone conduction speaker, and if the detected position where the frame is worn is the first position, the controller may play the multimedia through the sound output unit upon receiving a touch input on the touch recognition unit in a pattern preset for playing multimedia data.

Upon receiving a scroll input on the touch recognition unit, the controller may change the playback position of the currently playing multimedia data.

Upon receiving a scroll input on the touch recognition unit, the controller may adjust the volume of the sound output unit.

The electronic device may further include a display that is attachable and detachable to and from one end of the frame, and the controller may display at least either the title, playback position, or volume of the currently playing multimedia data.

If the detected position where the frame is worn is the second position during the playback of the multimedia data, the controller may pause the playback.

If the detected position where the frame is worn is the first position during the pause of the multimedia data, the controller may replay the multimedia data from the paused position.

The electronic device may further include a display that is attachable and detachable to and from one end of the frame, and if the currently playing multimedia data includes image data and the display is attached to the frame, the controller may output the image data on the display.

If the display is detached from the frame during the playback of the multimedia data, the controller may pause the playback of the multimedia data.

If the display is attached to the frame during the playback of the multimedia data, the controller may display a thumbnail image of the image data for the paused point in time on the display.

To accomplish the above object, another embodiment of the present invention provides a control method of an electronic device including a frame that a user can wear on the body, the control method including: detecting at least one of a first position where the frame is worn on the user's head, a second position where the frame is worn around the user's neck, and a third position where the frame is separate from the user; detecting a touch input on the touch recognition unit; and controlling call-related operations based on at least either the detected position where the frame is worn or the detected touch input.

In the controlling of call-related operations, if the detected position where the frame is worn changes from the second or third position to the first position while a call is coming in, the call may be connected.

The electronic device and the control method thereof according to the present invention have the following advantages.

According to the present invention, a variety of call-related or multimedia data-related functions can be used efficiently by changing the position where a frame wearable around the neck or on the head is worn.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 6 to 12 are views for explaining the control of call-related operations according to the first embodiment of the present invention.

FIGS. 15 to 19 are views for explaining the control of multimedia data-related operations according to the second embodiment of the present invention.

DETAILED DESCRIPTION

Figure 1:
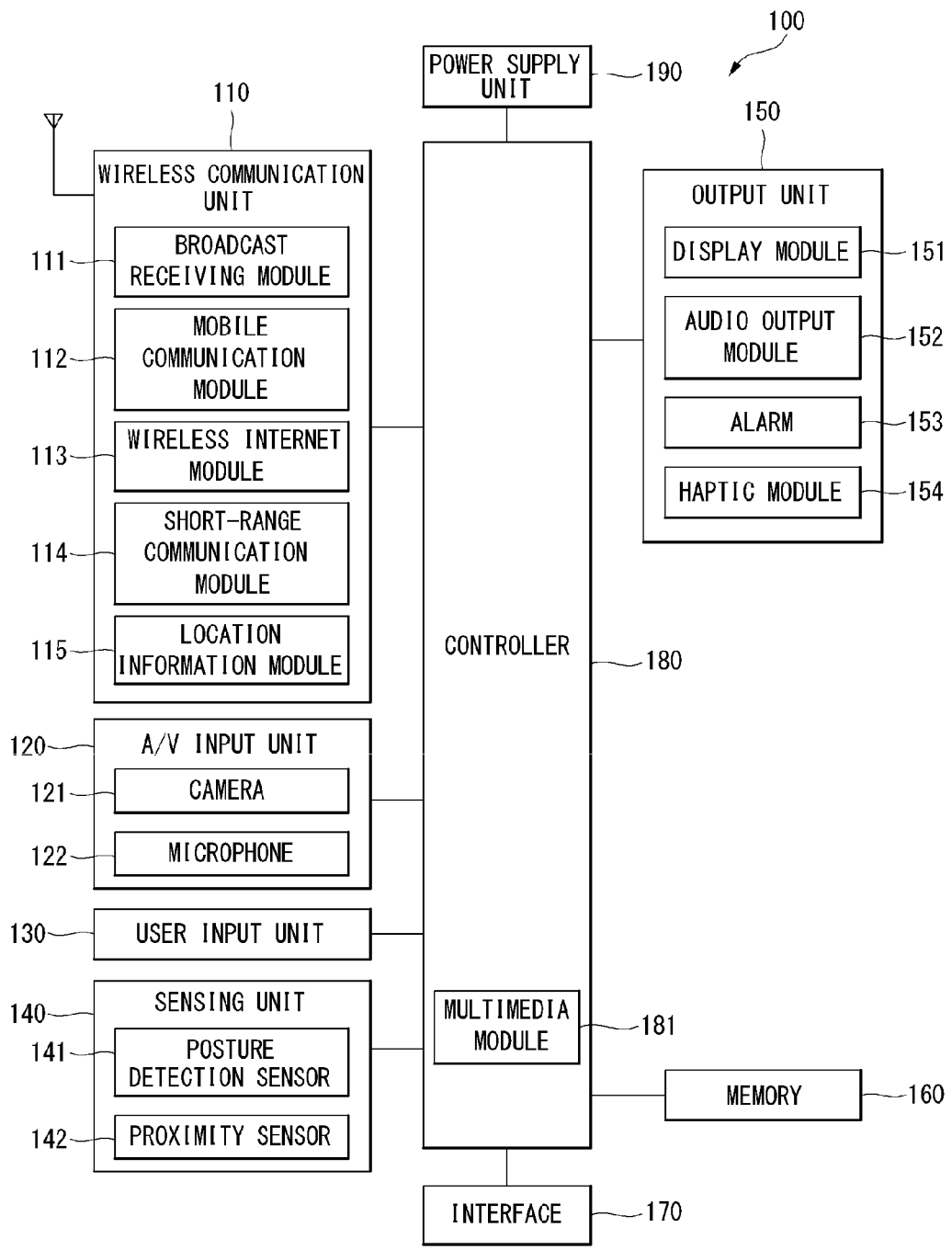
FIG. 1 is a block diagram of an electronic device according to an embodiment of the present invention.

The above and other aspects, features and advantages of the present disclosure will be more apparent from the following detailed description taken in conjunction with the accompanying drawings. As the invention allows for various changes and numerous embodiments, a particular embodiment will be illustrated in the drawings and described in detail in the written description. Like reference numerals refer to like elements throughout the specification. In describing the present disclosure, detailed descriptions of well-known functions or configurations will be omitted in order to not necessarily obscure the subject matter of the present disclosure. Numerals (e.g., first, second, etc.) used in the description of the present invention are only for distinguishing one element from another element.

An electronic device according to the present invention may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on. It should be apparent to those skilled in the art that a configuration according to an embodiment disclosed in this specification should be applicable to fixed or stationary terminals, such as a digital TV or a desktop computer, except for applications disclosed to be specific only to a mobile terminal.

FIG. 1 is a block diagram of an electronic device according to an embodiment of the present invention.

The electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 are not essential parts and the number of components included in the electronic device 100 can be varied. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal.

The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 is a module for identifying or otherwise obtaining the location of an electronic device. A global positioning system (GPS) module is a representative example of the location information module 115. According to the current technology, the GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module 115 may continuously calculate a current position in real time and calculate velocity information using the location or position information.

Referring to FIG. 1, the A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, if the electronic device 100 is a slide phone, the sensing unit 140 may sense whether the slide phone is opened or closed. Further, the sensing unit 140 may sense whether the power supply unit 190 supplies power and/or whether the interface 170 is connected to an external device. Meanwhile, the sensing unit 140 may include a posture detection sensor 141 and/or a proximity sensor 142.

The output unit 150 may generate visual, auditory and/or tactile output, and the output unit 150 may include the display module 151, an audio output module 152, an alarm 153 and a haptic module 154. The display module 151 may display information processed by the electronic device 100. The display module 151 may display a user interface (UI) and/or a graphic user interface (GUI) related to a telephone call when the electronic device 100 is in the call mode. The display module 151 may also display a captured and/or received image, a UI or a GUI when the electronic device 100 is in the video telephony mode or the photographing mode.

The display module 151 may include at least one of a liquid crystal display, a thin film transistor liquid crystal display, an organic light-emitting diode display, a flexible display and/or a 3D display. Some of the above displays may be configured as a transparent or light transmissive type display through which the outside may be viewed. This may be called "transparent display".

An example of the transparent display includes a transparent LCD. A rear structure of the display module 151 may also be of a light transmissive type. Accordingly, a user may see an object located behind the body (of the electronic device 100) through the transparent area of the body of the electronic device 100 is occupied by the display module 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display module 151 and a sensor sensing touch (hereafter, referred to as a touch sensor) form a layered structure (hereinafter, referred to as a touch screen), the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal (signals) corresponding to the touch input may be transmitted to a touch controller. The touch controller may then process the signal(s) and transmit data corresponding to the processed signal(s) to the controller 180. Accordingly, the controller 180 may detect a touched portion of the display module 151.

Referring to FIG. 1, the proximity sensor may be located in an internal region of the electronic device 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the electronic device 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like.

The alarm 153 may output a signal for indicating generation of an event of the electronic device 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The user identification module is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port.

The interface 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply unit 190 may receive external power and internal power and provide power required for operations of the components of the electronic device 100 under control of the controller 180. The various embodiments described herein may be implemented as software, hardware, or a combination thereof in a storage medium that may be read by a computer or a similar device thereof.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
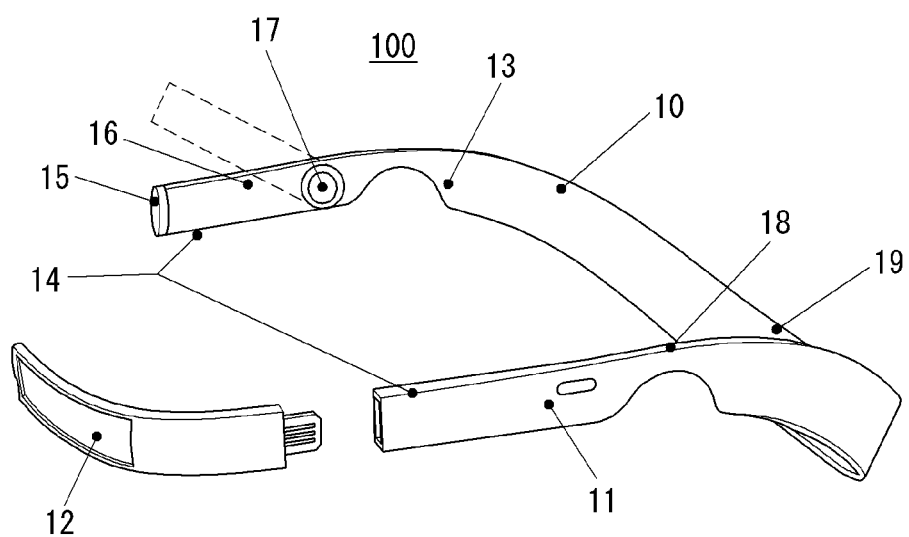
FIG. 2 is a perspective view of an electronic device according to an embodiment of the present invention.

FIG. 2 is a perspective view of an electronic device 100 according to an embodiment of the present invention.

Referring to FIG. 2, the electronic device 100 may be implemented as a band-shaped frame 10 with some or all of the components of FIG. 1 integrated in it.

The electronic device 100 may include a frame 10, a touch recognition unit 11, a display 12, a bone conduction speaker 13, a high-sensitive microphone 14, a camera 15, a PCB 16, an angle adjustment 17, a guide slot 18, and a battery 19. The components shown in FIG. 2 are not essential parts and the number of components included in the electronic device 100 can be varied.

The components of the electronic device 100 may now be described.

The electronic device 100 may be implemented as a band-shaped frame 10 that a user can wear on the head or neck. The frame 10 may be made of a shape memory alloy. The inside of the frame 10, a region that comes in contact with the user's head or neck, may be made of non-irritating silicon.

The electronic device 100 may be equipped with the touch recognition unit 11 on one side or both sides of the frame 10. The touch sensor 170 explained in FIG. 1 may recognize a touch input on the touch recognition unit 11. Touch input data through the touch recognition unit 11 may be used to perform a particular function of the electronic device 100.

The display 12 may be made to be attachable and detachable to and from an end of the frame 10. The display 12 may be transparent like normal glasses, and the user can look ahead through it by wearing the electronic device 100 on the head. Also, the display 12 may serve as a transparent display for providing information.

While the electronic device 100 of FIG. 2 includes the display 12 on one end of the frame 10, it may include the display 12 on the other end. In another embodiment, the electronic device 100 may include two displays 12—one on either end of the frame 10.

The electronic device 100 may include at least one bone conduction speaker 13 on at least one side of the frame 10. The bone conduction speaker 13 may be placed in close proximity to the ears, that is, on both sides of the frame 10, with the electronic device 100 worn on the user's head.

The bone conduction speaker 13 is a speaker that delivers sounds through bone conduction. Based on the principle that humans can perceive and hear sounds both through the ears and through the body (especially, vibrations through bones and blood), the bone conduction speaker 13 allows the user to recognize sounds by sending sound waves to the skull and then into the inner ear.

The electronic device 100 may include the high-sensitive microphone 14. In one embodiment of the present invention, the high-sensitive microphone 14 may be mounted on the side of the frame 10 so that it is placed in close proximity to the side of the user's face, i.e., mouth, with the electronic device 100 worn on the head.

The electronic device 100 may be equipped with the camera 15 on one end of the frame 10. The camera 15 is used to take images ahead of the electronic device 100, and can be rotated to a certain angle up, down, left, or right. The camera 15 may be used to take images of the face or eyes of the user wearing the electronic device 100.

While the electronic device 100 of FIG. 2 includes the camera 15 on one end of the frame 10, it may include the camera 15 on the other end. In another embodiment, the electronic device 100 may include a plurality of cameras on other sides of the frame 10.

The electronic device 100 may be equipped with the angle adjustment 17 on one end or both ends of the frame 10. When the user is wearing the electronic device 100 on the head or neck, the angle adjustment 17 can be adjusted to a certain angle up or down for comfortable wearing.

The electronic device 100 may be equipped with the guide slot 18 on both sides of the frame 10. In order for the user to wear the electronic device 100 on the head, a slot structure may be formed on both sides of the frame 10, i.e., where the user's ears should be. Accordingly, the user can wear the electronic device 100 as well while wearing normal glasses.

The electronic device 100 may be equipped with a battery 19 for supplying power to the electronic device 100 on the back side of the frame 10. That is, the battery 19 according to one embodiment of the present invention may be incorporated in the electronic device 100.

As described above, it is apparent that the shape of the electronic device 100 according to an embodiment of the present invention is not limited to the example shown in FIG. 2.

Figure 3:
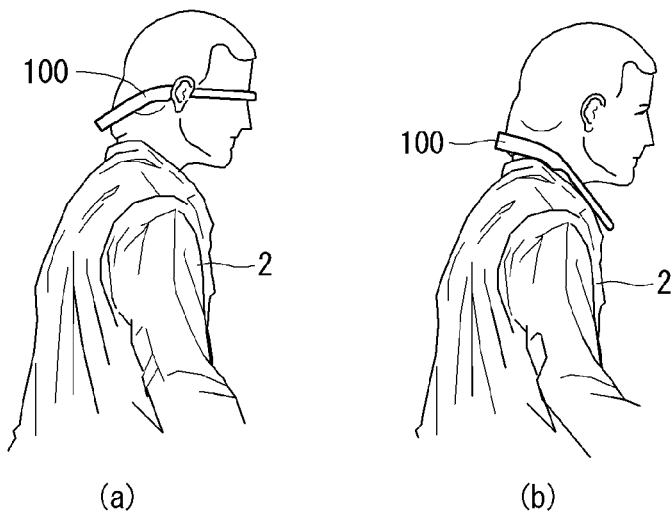
FIG. 3 illustrates an example of parts where an electronic device according to one embodiment of the present invention is worn.

FIG. 3 illustrates an example of parts where an electronic device according to one embodiment of the present invention is worn.

As shown in (a) of FIG. 3, the electronic device 100 may be worn on the head of the user 2. Both sides of the frame 10 implemented in a band shape may be worn in such a way as to hang on the ears of the user 2.

As shown in (b) of FIG. 3, the electronic device 100 may be worn around the neck of the user 2. That is, the band-shaped frame 10 may be worn in such a way as to hang around the neck of the user 2.

The user may wear the band-shaped frame 10 around the neck at normal times and on the head when executing a particular function. Also, it is needless to say that the user may wear the frame 10 on the head at normal times and pull it down around the neck when executing a particular function.

That is, the electronic device 100 may detect where the frame 10 is worn and control the operation of the electronic device 100.

Figure 4:
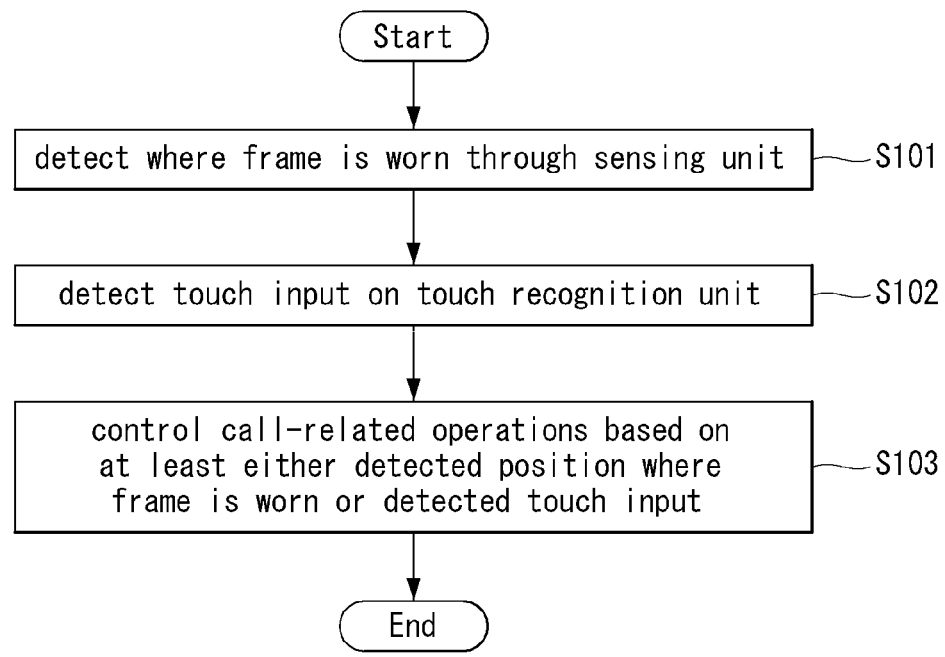
FIG. 4 is a flowchart showing a control method of an electronic device according to a first embodiment of the present invention.

FIG. 4 is a flowchart showing a control method of an electronic device according to a first embodiment of the present invention.

The electronic device 100 according to an embodiment of the present invention may include a sensing unit 140. The sensing unit 140 explained in FIG. 1 may detect where the user is wearing the electronic device 100 and generate a sensing signal for controlling the operation of the electronic device 100. That is, the sensing unit 140 may detect whether the user is wearing the electronic device 100 on the head or around the neck or whether the electronic device 100 is separate from the user or not. The sensing unit 140 may include a gyro sensor and an acceleration sensor.

The controller 180 of the electronic device 100 according to the embodiment of the present invention may detect where the frame 10 is worn, through the sensing unit 140 (S101). That is, the controller 180 may detect, through the sensing unit 140, at least one of a first position where the frame 10 is worn on the user's head, a second position where the frame 10 is worn around the user's neck, and a third position where the frame 10 is separate from the user.

The controller 180 according to the embodiment of the present invention may detect a touch input on the touch recognition unit 11 (S102). The touch input on the touch recognition unit 11 may occur by hand contact with the touch recognition unit 11.

In another embodiment, the touch input on the touch recognition unit 11 may occur as the user does a touch input (e.g., double-touch, scroll, etc) in a preset pattern to execute a particular function.

The controller 180 according to the embodiment of the present invention may control call-related operations based on at least either the detected position where the frame 10 is worn or the detected touch input (S103).

Upon an incoming call, the controller 180 may detect where the frame 10 is worn, detect a touch input on the touch recognition unit 11, and control operations such as connecting to the incoming call or ending the call.

Figure 5:
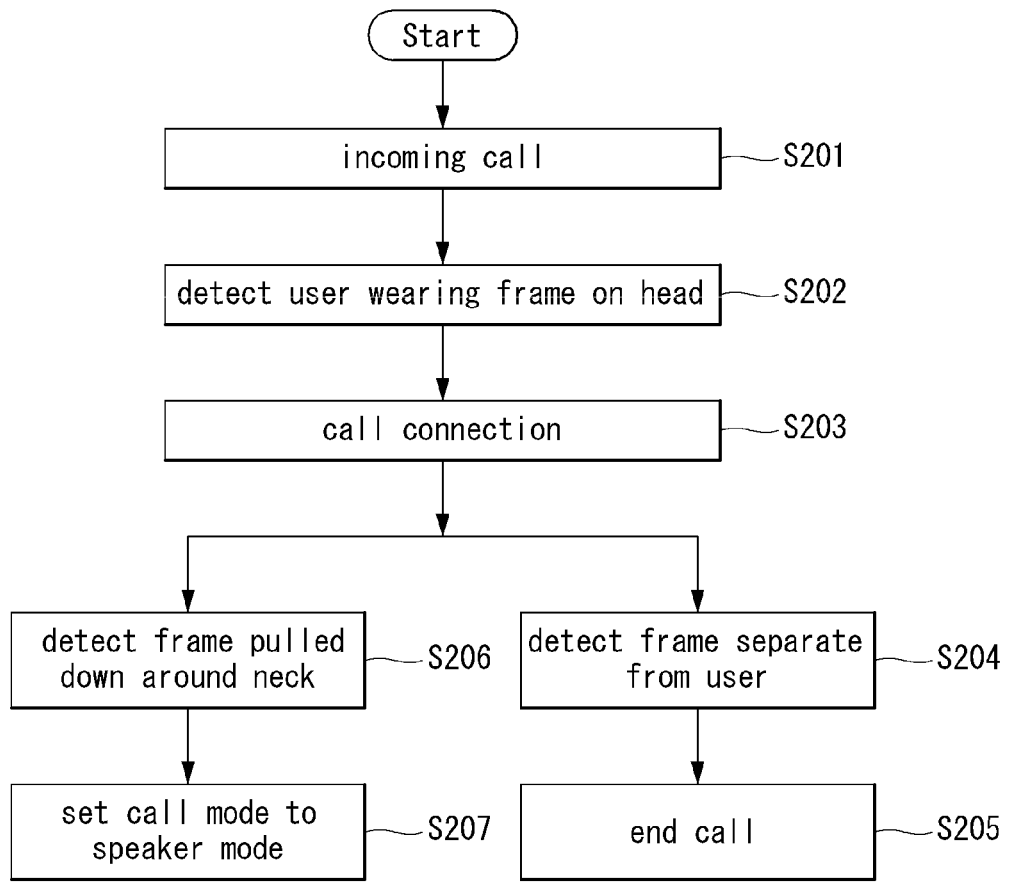
FIG. 5 is a flowchart for explaining the control of call-related operations according to the first embodiment of the present invention.

FIG. 5 is a flowchart for explaining the control of call-related operations according to the first embodiment of the present invention.

That is, FIG. 5 is a flowchart for explaining in more detail an example where call-related operations are controlled depending on where the frame 10 is worn.

The controller 180 may have an incoming call (S201). If the user is detected wearing the frame 10 on the head, the controller 180 may connect to the incoming call (S202 and S203). That is, upon an incoming call, the user may connect to the call by wearing the electronic device 100 on the head.

Upon detecting the frame 10 separate from the user, the controller 180 according to the embodiment of the present invention may end the call (S204 and S205). That is, when the user wants to end a call connection during the call, they may end the call by separating the frame 10 from the head.

Upon detecting the frame 10 pulled down around the neck, the controller 180 according to the embodiment of the present invention may set the call mode for the connected call to speaker mode (S206 and S207). That is, the controller 180 may switch the call from call mode to speaker mode by wearing the frame 10 around the neck during the call. In other words, the controller 180 may turn up the speaker and microphone volumes.

FIGS. 6 to 12 are views for explaining the control of call-related operations according to the first embodiment of the present invention.

Figure 6:
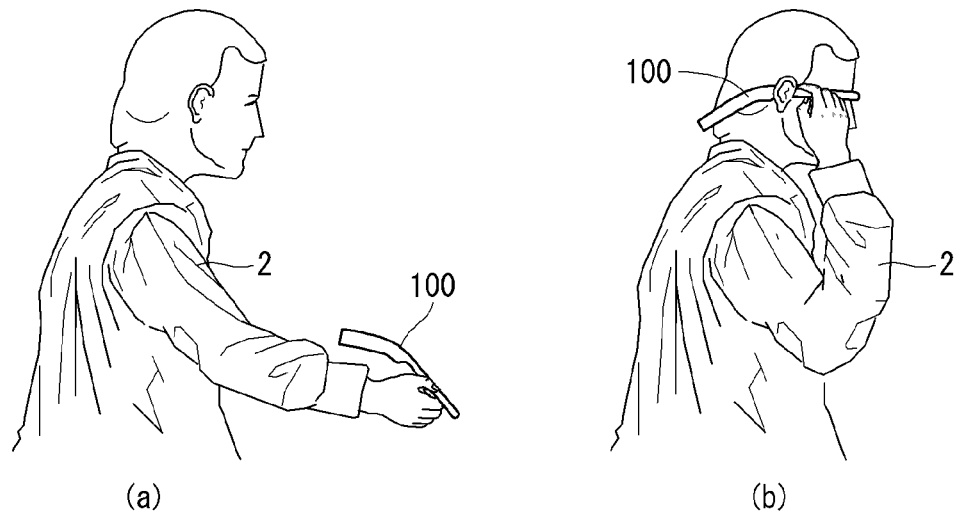

As shown in (a) and (b) of FIG. 6, the user 2 may wear the electronic device 100 on the head.

Upon detecting the frame 10 worn on the head when there is an incoming call, the electronic device 100 according to the first embodiment of the present invention may connect to the incoming call. That is, the electronic device 100 may operate in call mode.

This means that, when there is an incoming call while the user 2 is wearing the frame 10 around the neck or the frame 10 is separate from the user 20, the user can connect to the call by wearing the frame 10 on the head.

FIG. 7 illustrates an example where there is an incoming call while the user 2 is wearing the electronic device 100 on the head. As shown in (a) and (b) of FIG. 7, the user may do a touch input on the touch recognition unit 11 with a finger F2.

If the user 2 is wearing the frame 10 on the head while a call is coming in, the controller 180 may receive a touch input on the touch recognition unit 11 in a pattern preset for connecting to the call. The controller 180 may connect to the call based on the touch input.

For example, the touch input with the pattern preset for connecting to the call may involve touching the touch recognition unit 11 two times. The touch input pattern for connecting to the call may be preset on the electronic device 100, or set or changed by the user.

Figure 8:
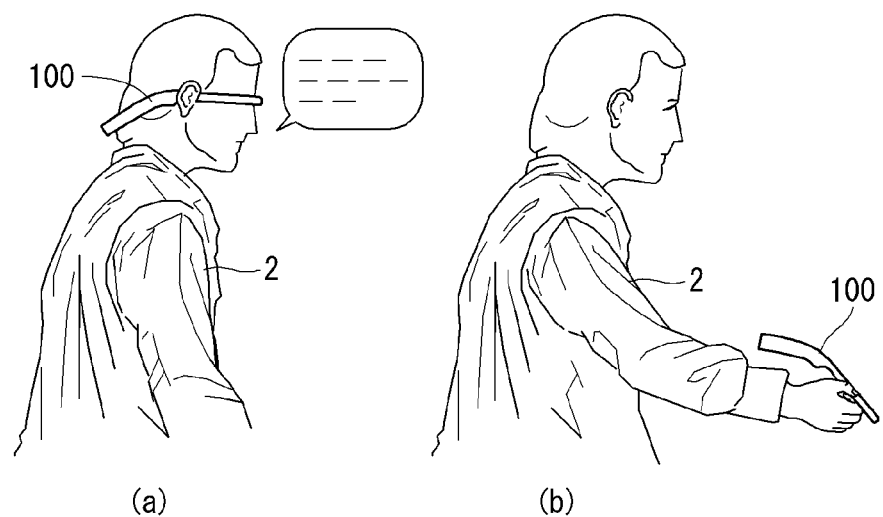

FIG. 8 illustrates an example where the user 2 separates the electronic device 100 from the head during a call.

The controller 180 may end the call connection based on where the frame 10 is worn. That is, upon detecting the electronic device 100, which the user has been wearing on the head, separate from the user during the call, the controller 180 may end call mode.

Also, the controller 180 may detect the direction where the electronic device 100, separate from the user, is placed on a plane, etc. The controller 180 may control the operation of the electronic device 100 depending on the detected direction.

This means that the user can end the connected call during the call by separating the electronic device 100 from them.

FIG. 9 illustrates an example where the user 2 wears the electronic device 100 around the neck during a call.

The controller 180 may set call mode to speaker mode based on where the frame 10 is worn. That is, upon detecting the user wearing the electronic device 100, which has been worn on the head, around the neck during the call, the controller 180 may switch call mode to speaker mode. The controller 180 may turn the microphone and speaker volumes up so as to operate in speaker mode.

This means that the user is able to talk to the other party of the connected call while wearing the electronic device 100 around the neck.

FIG. 10 illustrates an example where caller information is displayed on the display 12 when there is an incoming call.

(a) of FIG. 10 illustrates an example where the user of the electronic device 100 wears the electronic device 100 on the head. As shown in (b) of FIG. 10, when the user is wearing the electronic device 100 on the head, with the display 12 attached to it, the controller 180 may display predetermined information on the display 12.

For example, the caller name and number 51 of the incoming call may be displayed on the display 12 ((b) of FIG. 10).

FIG. 11 illustrates an example where a call connection request is transmitted if there is a missed call.

As shown in (a) of FIG. 11, the number and caller name 52 of the missed call may be displayed on the display 12.

As shown in (b) of FIG. 11, the controller 180 may receive an input for touching the touch recognition unit 11 with a finger F3 from the user. Upon receiving a touch input in a pattern preset for a call connection request, the controller 180 may transmit a call connection request to the number of the most recent incoming call.

For example, the touch input with the pattern preset for a call connection request may involve touching the touch recognition unit 11 three times. The touch input pattern for a call connection request may be preset on the electronic device 100, or set or changed by the user.

That is, the user may wear the electronic device 100 on the head and check the caller information of the missed call displayed on the display 12. The user may transmit a call connection request to the caller's number by touching the touch recognition unit 11 three times.

Figure 12:
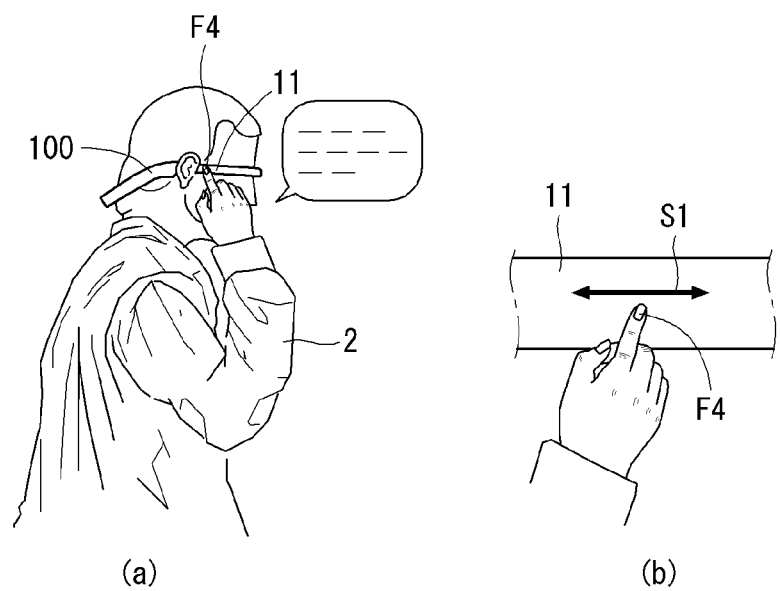

FIG. 12 illustrates an example of volume control during a call.

As shown in (a) of FIG. 12, the controller 180 may receive an input for touching the touch recognition unit 11 with a finger F4 when the electronic device 100 is wearing the electronic device 100 on the head.

(b) of FIG. 12 is an enlarged view illustrating the touch recognition unit 11 of the electronic device 100 of (a) of FIG. 12. As shown herein, the controller 180 may receive an input s1 for scrolling the touch recognition unit 11 with the finger F4.

Upon receiving the input s1 for scrolling the touch recognition unit 11 during a call, the controller 180 may adjust the call volume. That is, the controller 180 may turn the volume of the speaker 13 up in response to an input for scrolling in one direction and turn the volume of the speaker 13 down in response to an input for scrolling in the other direction.

This means that volume control can be done by scrolling the touch recognition unit 11 provided on the side of the frame 10 while the user is talking on the phone, wearing the electronic device 100 on the head.

In another embodiment of the present invention, when there is an incoming call, if the controller 180 receives a touch input on the touch recognition unit 11 in a pattern preset for ignoring the call, the controller 180 may end the incoming call.

For example, the touch input with the pattern preset for ignoring the call may involve touching the touch recognition unit 11 long. The touch input pattern for ignoring the call may be preset on the electronic device 100, or set or changed by the user.

Figure 13:
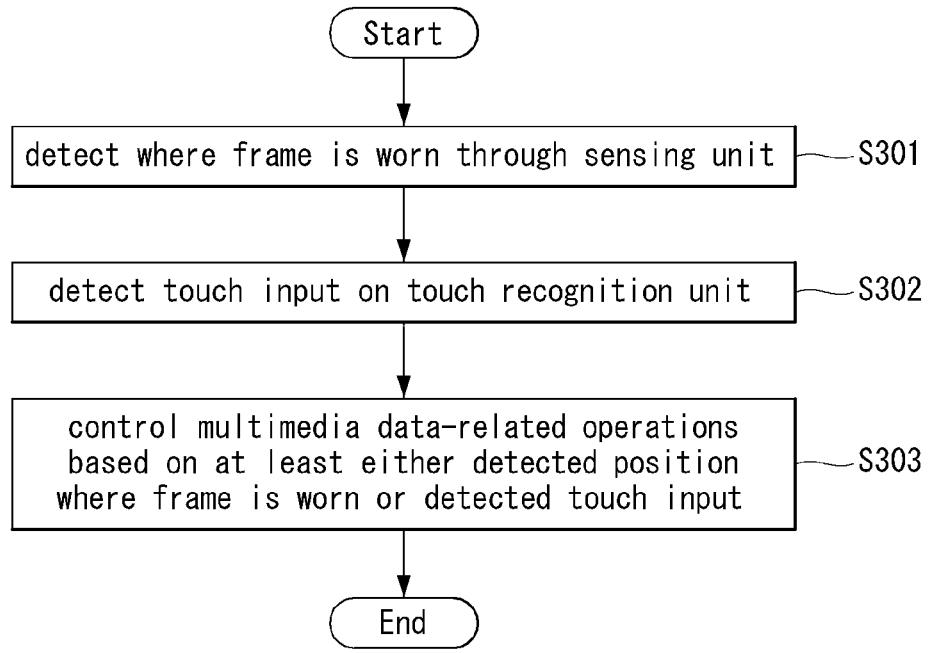
FIG. 13 is a flowchart of a control method of an electronic device according to a second embodiment of the present invention.

FIG. 13 is a flowchart of a control method of an electronic device according to a second embodiment of the present invention.

The controller 180 of the electronic device 100 according to an embodiment of the present invention may detect where the frame 10 is worn through the sensing unit 140 (S301). Also, the controller 180 may detect a touch input on the touch recognition unit 11 (S302). The controller 180 may control multimedia data-related operations based on at least either the detected position where the frame 10 is worn or the detected touch input (S303).

The electronic device 100 may include a memory 160 that stores multimedia data. The multimedia data may include music files and video files.

That is, as the user wears the electronic device 100 on the head and does a touch input on the touch recognition unit 11, the multimedia-related operations (e.g., play and stop) stored in the memory 160 may be executed.

Figure 14:
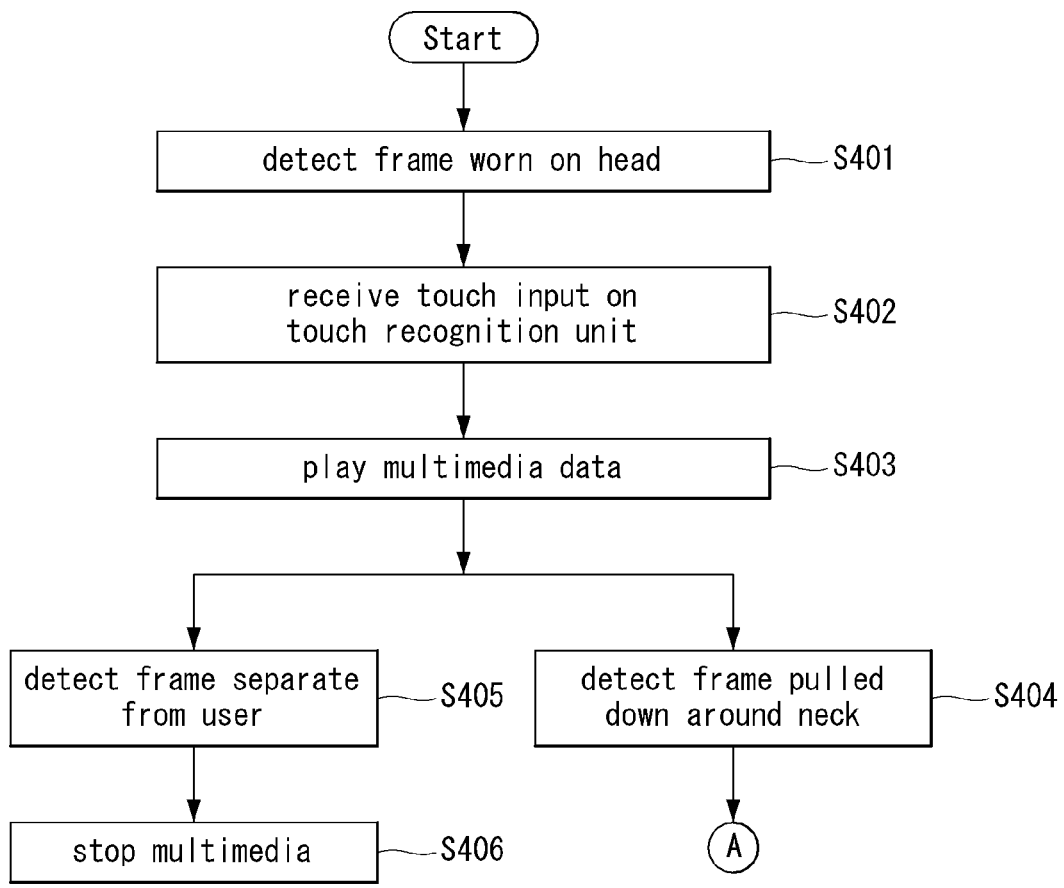
FIG. 14 is a flowchart for explaining the control of multimedia data-related operations according to the second embodiment of the present invention.

FIG. 14 is a flowchart for explaining the control of multimedia data-related operations according to the second embodiment of the present invention.

That is, FIG. 14 is a flowchart for explaining in more detail an example where multimedia data-related operations are controlled depending on where the frame 10 is worn.

The controller 180 may detect the frame 10 worn on the user's head (S401). Also, the controller 180 may receive a touch input on the touch recognition unit 11 (S402). The controller 180 may play multimedia data based on at least either the detected position where the frame 10 is worn or the received touch input (S403).

The touch input on the touch recognition unit 11 may denote a touch input with a pattern preset for playing multimedia data. The touch input pattern for playing multimedia data may be preset on the electronic device 100, or set or changed by the user. For example, the touch input for playing multimedia data may involve touching the touch recognition unit 11 once.

Upon detecting the frame 10 separate from the user (S404), the controller 180 may stop or pause the playback of multimedia data (S405 and S406).

That is, while watching multimedia data (e.g., a music file), wearing the frame 10 on the head, the user may stop the playback of the multimedia data by separating the frame 10 from them.

FIGS. 15 to 19 are views for explaining the control of multimedia data-related operations according to the second embodiment of the present invention.

FIG. 15 illustrates an example of the playback of multimedia data.

As shown in (a) of FIG. 15, the user 2 may wear the electronic device 100 on the head. As shown in (b) of FIG. 15, the user may do a touch input on the touch recognition unit 11 of the electronic device 100 with a finger F5.

The controller 180 may play multimedia (e.g., a music file) based on at least either the position where the electronic device 100 is worn or the touch input on the touch recognition unit 11.

(c) of FIG. 15 illustrates an example where the title 53 of the multimedia data (music file) is displayed on the display 12. That is, with the display 12 attached to the frame 10, the controller 180 may display information about the music file on the display 12 while the music file is playing.

FIG. 16 illustrates an example where the playback position of multimedia data is changed by a touch input on the touch recognition unit 11.

(a) of FIG. 16 is an enlarged view illustrating the touch recognition unit 11 of the electronic device 100. The controller 180 may receive an input for scrolling between first and second points p2 and p3 of the touch recognition unit 11 with a finger F6.

The controller 180 may recognize any one point on the touch recognition unit 11 as indicative of the playback position of playing multimedia data. That is, the controller 180 may recognize the point (first point) p2 as indicative of the beginning part of the multimedia data. In this case, the second point p3, spaced apart in a straight line from the first point p2 by a predetermined distance, may be recognized as indicative of the ending part of the multimedia data.

(b) of FIG. 16 illustrates an example where an indicator bar i2 indicating the playback position of multimedia data is displayed on the display 12.

With the display 12 attached to the frame 10, the controller 180 may display on the display 12 the playback position of multimedia data, which changes based on a scroll input on the touch recognition unit 11.

That is, with the frame 10 worn on the head, the user can check feedback to the scroll input on the touch recognition unit 11 through the display 12.

The length of the indicator bar i2 displayed on the display 12 may change based on the scroll input. The controller 180 may play multimedia data while changing the playback position of the multimedia data based on the scroll input.

FIGS. 17 and 18 illustrate an example where operations related to the playback of multimedia data are controlled based on a touch input on the touch recognition unit 11.

(a) of FIG. 17 is an enlarged view illustrating the touch recognition unit 11. It is assumed that second and third points p5 and p6 are spaced apart in a straight line with respect to any one point (first point) p4 of the touch recognition unit 11 by predetermined distances, respectively.

The first point p4 is a point at which a signal for playing the data preceding the currently playing multimedia data is generated.

The second point p5 is a point at which a signal for pausing or stopping data playback or playing data is generated.

The third point p6 is a point at which a signal for playing the following data to the currently playing data.

The preceding or following data may denote a position in the memory 160 where the multimedia data is stored. For example, the preceding or following data may denote the data that precedes or follows the currently playing data in a playlist stored or temporarily stored in the memory 160.

First, second, and third icons 55 (i3, i4, and i5) shown in (b) of FIG. 17 may correspond to the points p4, p5, and p6 at which the touch input of (a) of FIG. 17 is received.

For example, upon receiving an input for touching the third point p6 with a finger F7 from the user, the controller 180 may display feedback (e.g., highlighting) indicating that the third icon i5 is chosen. Based on the touch input on the third point p6, the controller 180 may generate a signal for playing the data following the currently playing data.

That is, the user can check feedback to the touch input on the touch recognition unit 11 through the display 12. This means that, by touching a certain point on the touch recognition unit 11, the user can find out which icon for a particular function corresponds to the detected point.

(a) of FIG. 18 is an enlarged view illustrating the touch recognition unit 11.

It is assumed that second and third points p5 and p6 are spaced apart in a straight line with respect to any one point (fourth point) p7 of the touch recognition unit 11 and another point (fifth point) p8 are vertically spaced apart from each other by a predetermined distance.

The controller 180 may receive an input for scrolling between the fourth and fifth points p7 and p8 with a finger F8. The controller 180 may adjust the speaker volume based on the scroll input.

(b) of FIG. 18 illustrates an example 56 where an icon i6 representing the speaker volume is displayed on the display 12. That is, the controller 180 may display the volume, which changes based on the scroll input of (a) of FIG. 18, as the icon i6 on the display 12.

This means that, by doing a scroll input on the touch recognition unit 11 in a vertical direction, the user can check feedback to the scroll input through the display 12.

FIG. 19 illustrates an example where multimedia data includes image data.

As shown in (a) of FIG. 19, the controller 180 may display the currently playing image data on the display 12.

(b) of FIG. 19 illustrates an example of the occurrence of an event during the playback of image data. For example, upon an incoming call, the controller 180 may display information (e.g., phone number and name) e1 about the caller on the display 12.

Upon an incoming call during the playback of multimedia data, the controller may reject or connect to the incoming call or send a response message as it receives a preset touch input on the touch recognition unit 10.

The preset touch input may have different patterns to perform different functions. The touch input may be preset on the electronic device, or set or changed by the user.

Figure 20:
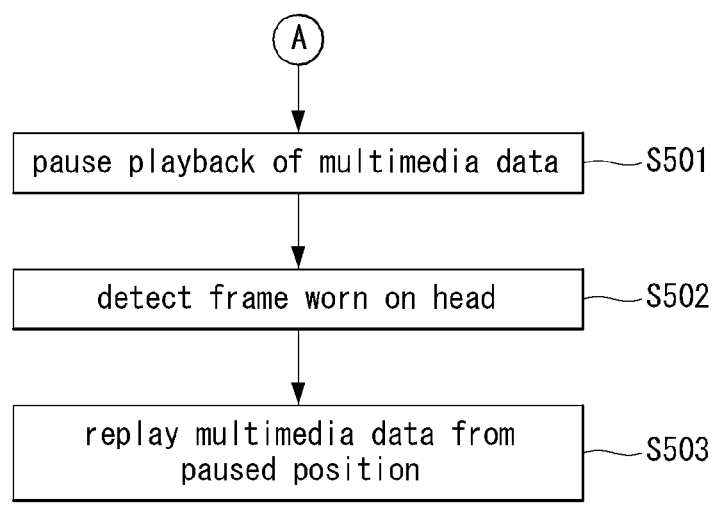
FIG. 20 is a flowchart for explaining another example of the control of multimedia data-related operations according to the second embodiment of the present invention.

FIG. 20 is a flowchart for explaining another example of the control of multimedia data-related operations according to the second embodiment of the present invention.

FIG. 20 is a flowchart illustrating in detail an example regarding the step S404 of FIG. 14.

Referring to FIG. 14, the controller 180 may detect the frame 10, which has been worn on the head, worn around the neck (S404 of FIG. 14) during the playback of multimedia data. Upon detecting the frame 10 worn around the neck 10, the controller 180 may pause the playback of the multimedia data (S501 of FIG. 20).

The controller 180 may detect the frame 10 worn on the head during the pause of the multimedia data (S502). Upon detecting the frame 10 worn on the head, the controller 180 may replay the multimedia data from the paused position (S503). This means that, if the frame 10 is pulled up from the neck to the head, the controller 180 may replay the paused multimedia data.

Figure 21:
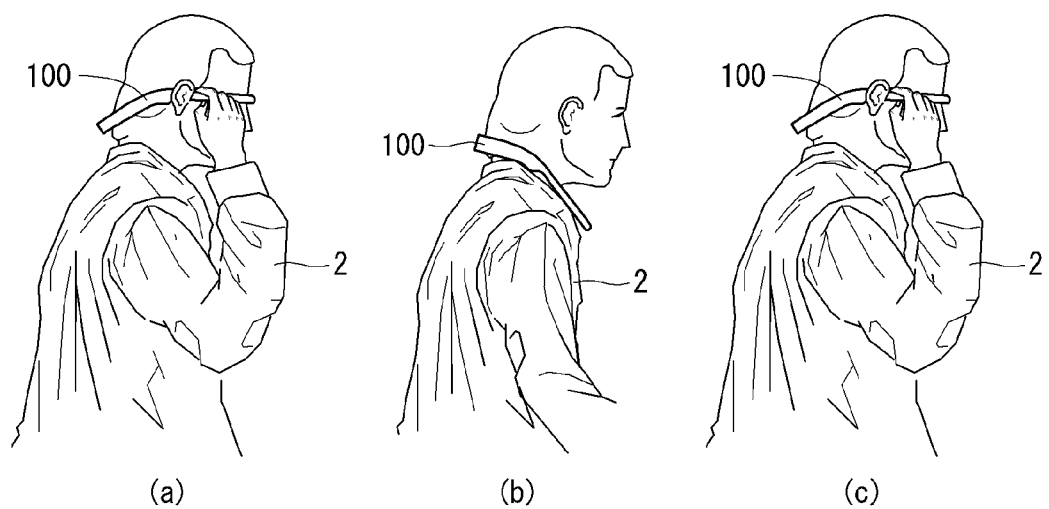
FIGS. 21 and 22 are flowcharts for explaining another example of the control of multimedia data-related operations according to the second embodiment of the present invention.
Figure 22:
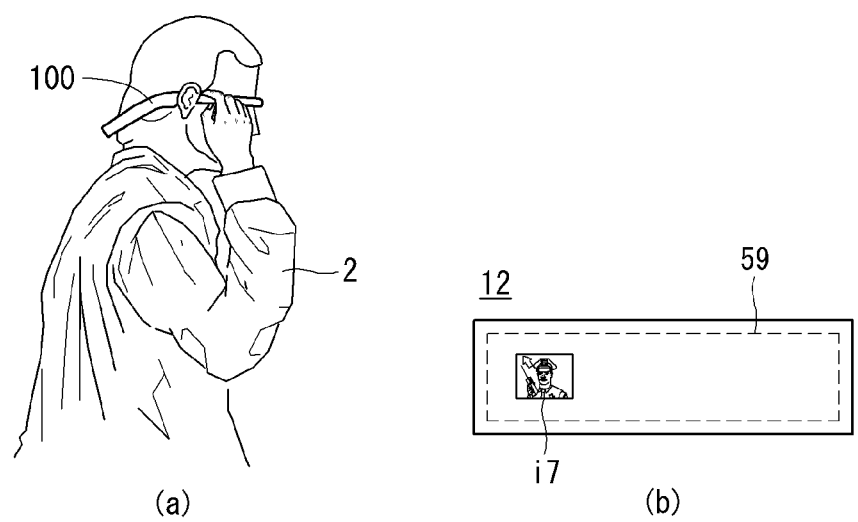

FIGS. 21 and 22 are flowcharts for explaining another example of the control of multimedia data-related operations according to the second embodiment of the present invention.

FIG. 21 illustrates an example of operation control depending on where the frame 10 is worn during the playback of multimedia data.

As shown in (a) and (b) of FIG. 21, the user 2 may pull the frame 10 down from the head to the neck during the playback of multimedia data. Upon detecting the frame 10 pulled down to the neck, the controller 180 may pause the playing multimedia data.

As shown in (b) and (c) of FIG. 21, upon detecting the frame 10 pulled down from the neck to the head, the controller 180 may replay the paused multimedia data from the paused position.

(a) of FIG. 22 illustrates an example where the user 2 wearing the electronic device 100 on the head during the pause of multimedia data.

(b) of FIG. 22 illustrates an example where the paused multimedia data includes image data. As shown in (b) of FIG. 22, upon detecting the frame 10 worn on the user's head, the controller 180 may display a thumbnail image i7 of the image data for the paused point in time.

In another embodiment, when the detachable display 12 is detached from the frame 10 during the playback of image data, the controller 180 may pause the currently playing image data. Also, when the display 12 is attached to the frame 10, the controller 180 may display a thumbnail image of the image data for the paused point in time on the display 12.

Moreover, when the display 12 is attached to the frame 10, the controller 180 may replay the image data from the paused point in time.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

An electronic device may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a electronic device that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a frame shaped to be worn by a user;
a touch recognition unit provided on at least one side of the frame;
a sensing unit configured to sense whether the frame is worn over the user's ears, around the user's neck, or not worn over the user's ears or around the user's neck;
a display that is attachable to and detachable from one end of the frame; and
a controller configured to:
recognize a position of the frame based on sensing by the sensing unit, the position being a first position when the frame is worn over the user's ears, a second position when the frame is worn around the user's neck, and a third position when the frame is not worn over the user's ears and is not worn around the user's neck;
cause connection to an incoming call in response to recognition of the first position when the call is received;
cause the display to display a volume adjusting bar and an indicator for adjusting a volume level, wherein the indicator is displayed at a first position of the display in response to a first touch input received at a specific point on the touch recognition unit, and wherein a length of the volume adjusting bar corresponds to a vertical length of the touch recognition unit; and
cause the display to display the indicator at a second position of the display in response to a scrolling input received via the touch recognition unit, the scrolling input starting from the specific point and moving in a vertical direction,
wherein both the frame and the attached display are worn on a head of the user when the frame is worn over the user's ears.

2. The electronic device of claim 1, wherein the controller is further configured to cause the connection to the incoming call in response to a second touch input received via the touch recognition unit in a pattern preset for connecting to the incoming call.

3. The electronic device of claim 1, wherein the controller is further configured to end the connection when a change of the position from the first position to the third position is recognized during the connected incoming call.

4. The electronic device of claim 3, wherein the controller is further configured to set a call mode to a speaker mode when the recognized position is changed from the first position to the second position during the connected incoming call.

5. The electronic device of claim 1, wherein the controller is further configured to ignore the incoming call, such that the incoming call is not connected, in response to a second touch input received via the touch recognition unit in a pattern preset for ignoring the incoming call.

6. The electronic device of claim 1, wherein the controller is further configured to cause transmission of a call connection request to a device corresponding to a most recent incoming call in response to a second touch input received via the touch recognition unit in a pattern preset for the transmission of the call connection request, the second touch input received while the first position is recognized by the controller.

7. The electronic device of claim 1, further comprising a sound output unit including a bone conduction speaker, wherein the controller is further configured to adjust the volume level of the sound output unit in response to the scrolling input.

8. An electronic device comprising:
a frame shaped to be worn by a user;
a touch recognition unit provided on at least one side of the frame;
a sensing unit configured to sense whether the frame is worn over the user's ears, around the user's neck, or not worn over the user's ears or around the user's neck;
a display that is attachable to and detachable from one end of the frame; and
a controller configured to:
  recognize a position of the frame based on sensing by the sensing unit, the position being a first position when the frame is worn over the user's ears, a second position when the frame is worn around the user's neck, and a third position when the frame is not worn over the user's ears and is not worn around the user's neck;
  play the stored multimedia data when the first position is recognized;
  cause the display to display icons for controlling playback of the multimedia data, wherein the displayed icons are arranged in a horizontal line with respect to a first touch input received at a first specific point on the touch recognition unit; and
  cause the display to display a feedback in response to a second touch input received via a second specific point on the touch recognition unit, the second specific point corresponding to one of the displayed icons that is selected by the second touch input,
wherein both the frame and the attached display are worn on a head of the user when the frame is worn over the user's ears.

9. The electronic device of claim 8, further comprising a sound output unit including a bone conduction speaker, wherein the controller is further configured to cause the sound output unit to output sound of the played multimedia data in response to a third touch input received via the touch recognition unit in a pattern preset for playing the multimedia data.

10. The electronic device of claim 9, wherein the controller is further configured to change a playback position of the multimedia data in response to a scrolling input received via the touch recognition unit.

11. The electronic device of claim 9, wherein the controller is further configured to cause the display to display at least one of a title, a playback position, or a volume level of the multimedia data being played.

12. The electronic device of claim 9, wherein the controller is further configured to pause the playing of the multimedia data when the recognized position is changed from the first position to the second position during the playing of the multimedia data.

13. The electronic device of claim 12, wherein the controller is further configured to resume the playing of the multimedia data from a paused position of the multimedia data in response to the first position recognized by the controller while the playing of the multimedia data is paused.

14. A control method of an electronic device, comprising:
recognizing a position of a frame of the electronic device with respect to a user, the position being a first position when the frame is worn over ears of the user, a second position when the frame is worn around a neck of the user, and a third position when the frame is not worn over the user's ears and is not worn around the user's neck;
connecting to an incoming call in response to recognition of the first position when the incoming call is received;
displaying a volume adjusting bar and an indicator for adjusting a volume level, wherein the indicator is displayed at a first position of a display in response to a touch input received at a specific point on the touch recognition unit, and wherein a length of the volume adjusting bar corresponds to a vertical length of the touch recognition unit; and
displaying the indicator at a second position of the display in response to a scrolling input received via the touch recognition unit, the scrolling input starting from the specific point and moving in a vertical direction,
wherein the display is attachable to and detachable from one end of the frame, and
wherein both the frame and the attached display are worn on a head of the user when the frame is worn over the user's ears.

* * * * *